(12) United States Patent
Hubbert et al.

(10) Patent No.: US 10,539,148 B2
(45) Date of Patent: Jan. 21, 2020

(54) FAN ROTOR WITH INTEGRATED PLATFORM ATTACHMENT

(71) Applicant: UNITED TECHNOLOGIES CORPORATION, Farmington, CT (US)

(72) Inventors: Corey L. Hubbert, Manchester, CT (US); Peter V. Tomeo, Middletown, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 446 days.

(21) Appl. No.: 15/028,512

(22) PCT Filed: Sep. 5, 2014

(86) PCT No.: PCT/US2014/054184
§ 371 (c)(1),
(2) Date: Apr. 11, 2016

(87) PCT Pub. No.: WO2015/076900
PCT Pub. Date: May 28, 2015

(65) Prior Publication Data
US 2016/0252103 A1    Sep. 1, 2016

Related U.S. Application Data

(60) Provisional application No. 61/889,685, filed on Oct. 11, 2013.

(51) Int. Cl.
*F04D 29/34* (2006.01)
*F01D 5/30* (2006.01)
(Continued)

(52) U.S. Cl.
CPC .......... *F04D 29/34* (2013.01); *F01D 5/3053* (2013.01); *F01D 11/008* (2013.01); *F04D 29/329* (2013.01); *F04D 29/644* (2013.01)

(58) Field of Classification Search
CPC .... F01D 5/3007; F01D 5/3053; F01D 11/008; F04D 29/329; F04D 29/34; F04D 29/644;
(Continued)

(56) References Cited

U.S. PATENT DOCUMENTS 2,751,189 A * 6/1956 Ledwith ................ F01D 5/3007
416/193 A
2,970,809 A 2/1961 Kroon
(Continued)

FOREIGN PATENT DOCUMENTS

WO    2014193512 A2    12/2014
WO    2015006438 A1    1/2015

OTHER PUBLICATIONS

International Search Report of International Application No. PCT/US2014/054184, International Filing Date: Sep. 5, 2014; dated Jun. 16, 2015; 3 Pgs.

(Continued)

*Primary Examiner* — Ninh H. Nguyen
*Assistant Examiner* — Jesse M Prager
(74) *Attorney, Agent, or Firm* — Cantor Colburn LLP

(57) ABSTRACT

A fan rotor, for an aircraft engine, including at least one blade root attachment lug, each blade root attachment lug including an attachment lug surface, wherein at least one cavity is disposed on each attachment lug surface.

14 Claims, 4 Drawing Sheets

(51) Int. Cl.
  *F01D 11/00* (2006.01)
  *F04D 29/32* (2006.01)
  *F04D 29/64* (2006.01)
(58) Field of Classification Search
  CPC .... F04D 29/321; F04D 29/322; F04D 29/325; F05D 2220/36
  See application file for complete search history.

(56) References Cited

U.S. PATENT DOCUMENTS

| | | | |
|---|---|---|---|
| 3,554,668 A * | 1/1971 | Wagle | F01D 5/06 416/198 A |
| 5,102,302 A * | 4/1992 | Schilling | B64C 11/04 416/134 A |
| 5,240,377 A | 8/1993 | Farr | |
| 6,447,250 B1 | 9/2002 | Corrigan et al. | |
| 6,726,452 B2 | 4/2004 | Strassberger et al. | |
| 8,246,310 B2 | 8/2012 | Pierrot et al. | |
| 8,277,188 B2 | 10/2012 | Belmonte | |
| 2004/0156719 A1 | 8/2004 | Czachor | |
| 2010/0209251 A1* | 8/2010 | Menheere | F01D 5/3007 416/193 A |
| 2012/0082783 A1 | 4/2012 | Barnett et al. | |
| 2012/0244003 A1 | 9/2012 | Mason | |

OTHER PUBLICATIONS

Written Opinion of International Searching Authority for International Application No. PCT/US2014/054184; International Filing Date: Sep. 5, 2014; dated Jun. 16, 2015; 11 Pgs.
European Search Report for Application No. EP 14 86 3712.
European Search Report for Application No. 15151647.3-1610; dated Aug. 20, 2015; 3 pgs.

* cited by examiner

FAN ROTOR WITH INTEGRATED PLATFORM ATTACHMENT

CROSS REFERENCE TO RELATED APPLICATION

The present application is related to, claims the priority benefit of U.S. Provisional Patent Application Ser. No. 61/889,685, filed Oct. 11, 2013. The contents of this application is hereby incorporated by reference in its entirety into this disclosure.

GOVERNMENT LICENSE RIGHTS

This invention was made with government support under Contract No. DTFAWA-10-C-00041 awarded by the Federal Aviation Administration. The government has certain rights in the invention.

TECHNICAL FIELD OF THE DISCLOSED EMBODIMENTS

The presently disclosed embodiments generally relate to gas turbine engines and, more particularly, to a fan rotor with an integrated platform attachment.

BACKGROUND OF THE DISCLOSED EMBODIMENTS

Axial turbine engines generally include fan section, compressor, combustor and turbine sections positioned along a centerline referred to as the engines "axis of rotation". The fan, compressor, and combustor sections add work to air (also referred to as "core gas") flowing through the engine. The turbine extracts work from the core gas flow to drive the fan and compressor sections. The fan, compressor, and turbine sections each include a series of stator and rotor assemblies. The stator assemblies, which do not rotate (but may have variable pitch vanes), increase the efficiency of the engine by guiding core gas flow into or out of the rotor assemblies.

The fan section includes a rotor assembly and a stator assembly. The rotor assembly of the fan includes a rotor disk and a plurality of outwardly extending rotor blades. Each rotor blade includes an airfoil portion, a dove-tailed root portion, and a platform. The airfoil portion extends through the flow path and interacts with the working medium gases to transfer energy between the rotor blade and working medium gases. The dove-tailed root portion engages attachment means of the rotor disk. The platform typically extends circumferentially from the rotor blade to a platform of an adjacent rotor blade. The platform is disposed radially between the airfoil portion and the root portion. The stator assembly includes a fan case, which circumscribes the rotor assembly in close proximity to the tips of the rotor blades.

To reduce the size and cost of the rotor blades, the platform size may be reduced and a separate fan blade platform may be attached to the rotor disk. To accommodate the separate fan blade platforms, outwardly extending tabs are forged onto the rotor disk to enable attachment of the platforms. As such, the forging weight, the finished weight, and the inscribed circle of the rotor disk may be larger than desired. There is therefore a need to reduce the size of the rotor disk, yet still accommodate the attachment of fan blade platforms.

BRIEF SUMMARY OF THE DISCLOSED EMBODIMENTS

In one aspect, a fan rotor for a gas turbine engine of the present disclosure is provided. The fan rotor includes at least one blade root attachment lug, each including an attachment lug surface, a blade root attachment lug transverse axis, and a blade root attachment lug longitudinal axis, wherein the blade root attachment lug transverse axis is substantially perpendicular to the blade root attachment lug longitudinal axis. Each attachment lug surface includes a proximal end and a distal end. The fan rotor further includes at least one cavity disposed in each attachment lug surface.

In one embodiment, a first cavity is disposed between the blade root attachment lug transverse axis and the proximal end of the attachment lug surface. In another embodiment, the first cavity further penetrates the proximal end of the attachment lug surface. In one embodiment, a second cavity is disposed between the blade attachment lug transverse axis and proximate to the distal end of the attachment lug surface. In another embodiment, a second cavity is disposed at approximately a midpoint between the proximal end and the distal end of the attachment lug surface.

In one embodiment, the fan rotor further includes a third cavity disposed in the attachment lug surface. In one embodiment, the third cavity is positioned between the first cavity and the second cavity.

In one embodiment, the fan rotor further includes a fourth cavity disposed in the attachment lug surface. In one embodiment, the fourth cavity penetrates the proximal end of the attachment tab surface, and is adjacent to the first cavity.

In one embodiment, the fan rotor further includes a blade root attachment lug aperture disposed within each of the blade root attachment lugs. In one embodiment, the blade root attachment lug aperture is substantially parallel to the blade root attachment lug longitudinal axis. In one embodiment, the blade root attachment lug aperture intersects each of the at least one cavities.

In one embodiment, the fan rotor further includes a fan blade platform including at least one connector operably coupled to each of the at least one blade root attachment lug. Each of the at least one connectors include a fan blade platform aperture formed therethrough. In one embodiment, the fan rotor further includes a pin disposed in the blade root attachment lug aperture and each of the fan blade platform apertures.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

Figure 1:
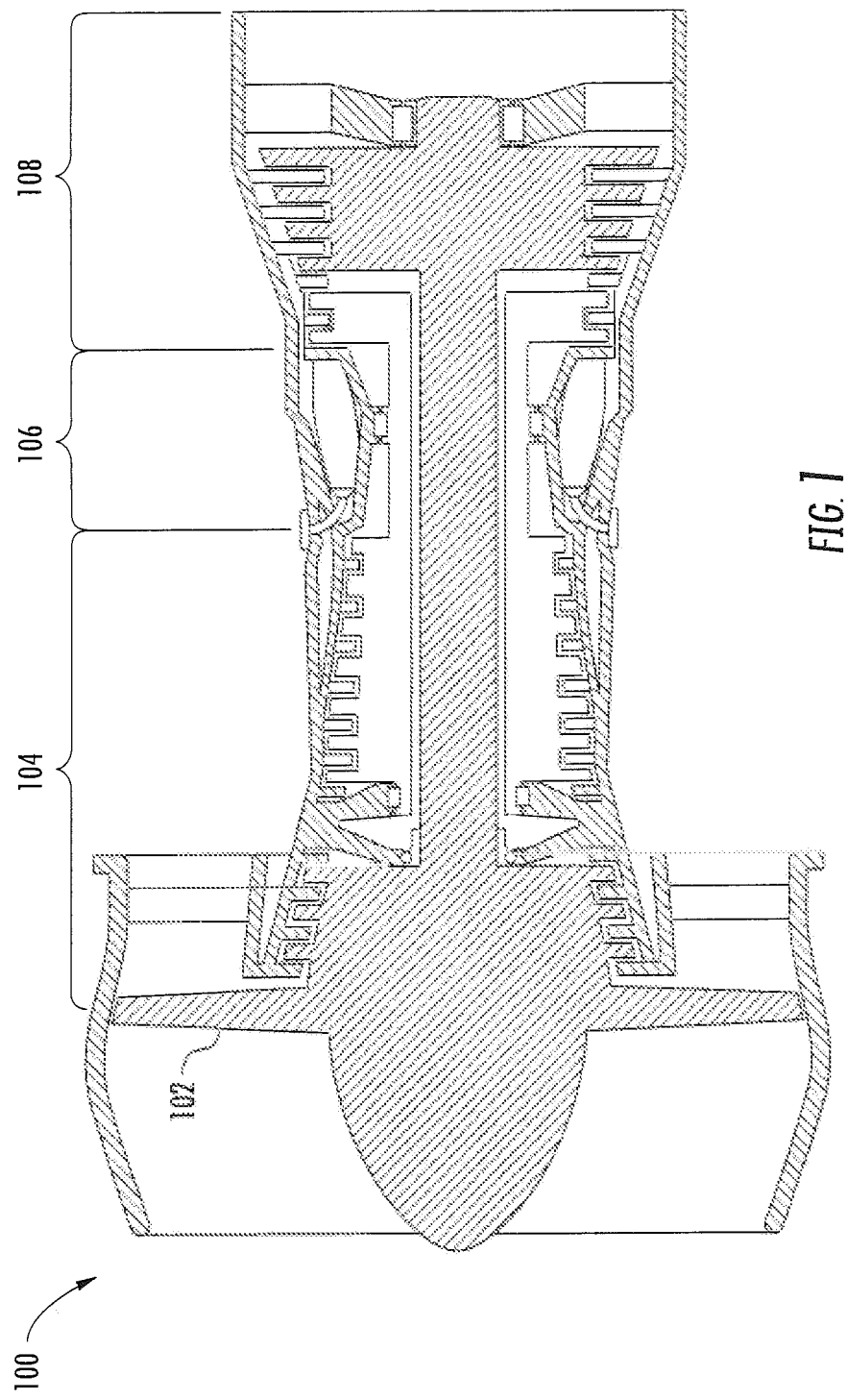
FIG. 1 is a general schematic view of a gas turbine engine as an exemplary application of the described subject matter.

An overview of the features, functions and/or configuration of the components depicted in the figures will now be presented. It should be appreciated that not all of the features of the components of the figures are necessarily described. Some of these non-discussed features, as well as discussed features are inherent from the figures. Other non-discussed features may be inherent in component geometry and/or configuration.

DETAILED DESCRIPTION OF THE DRAWINGS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a gas turbine engine 100. As shown in FIG. 1, engine 100 is depicted as a two-spool turbofan that generally incorporates a fan section 102, a compressor section 104, a combustion section 106 and a turbine section 108. Although depicted as a two-spool turbofan gas turbine engine in the disclosed non-limiting embodiment, it should be understood that the concepts described herein are not limited to use with two-spool turbofans as the teachings may be applied to other types of gas turbine engines including three-spool and gear architectures.

Figure 2:
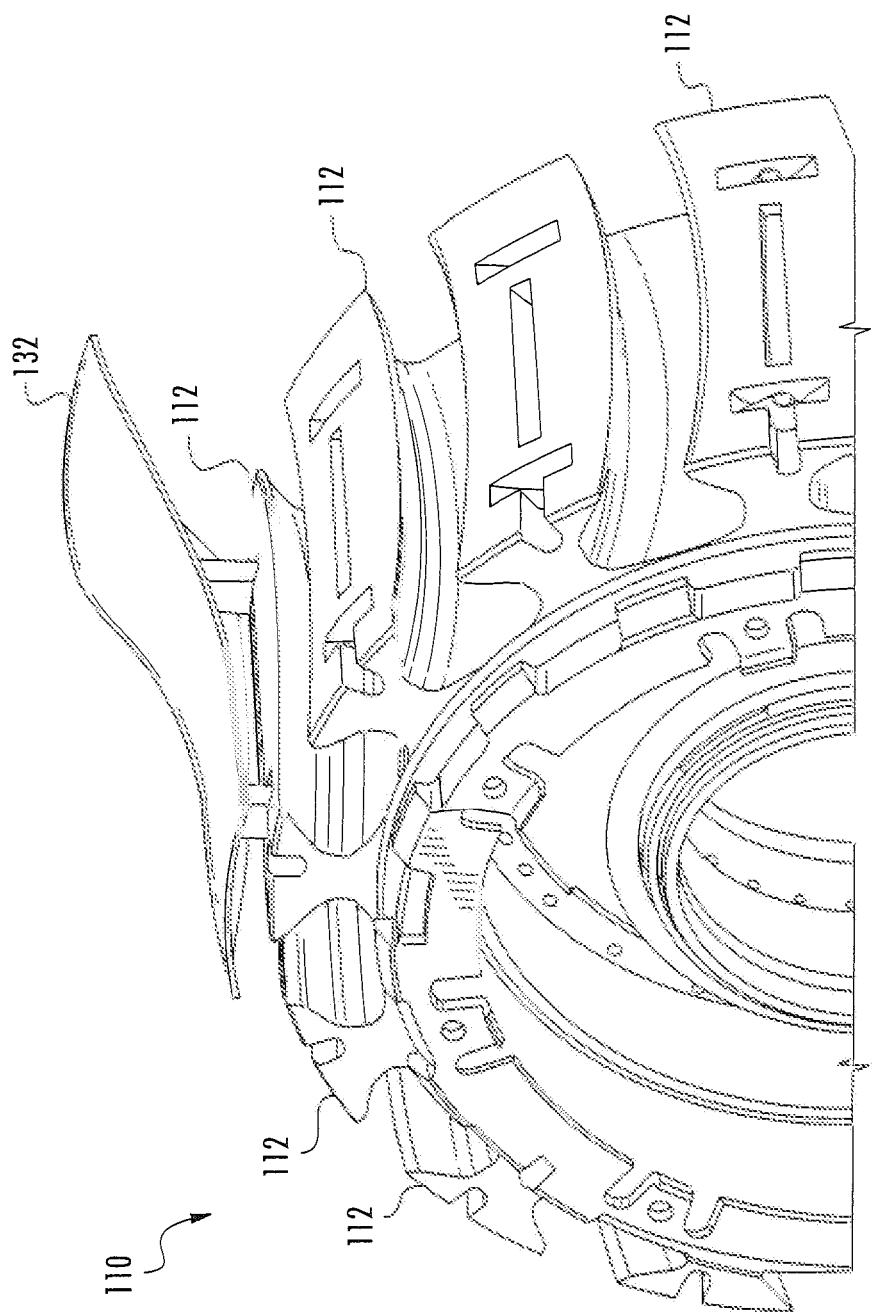
FIG. 2 is a perspective view of a fan rotor including a plurality of blade root attachment lugs in one embodiment.

FIG. 2 illustrate a perspective view of an embodiment of a fan rotor 110 within the fan section 102. In one embodiment, the fan rotor 110 includes at least one blade root attachment lug 112. During installation of the fan section 102, a fan blade platform 132 is operably coupled to each of the blade root attachment lugs 112.

Figure 3:
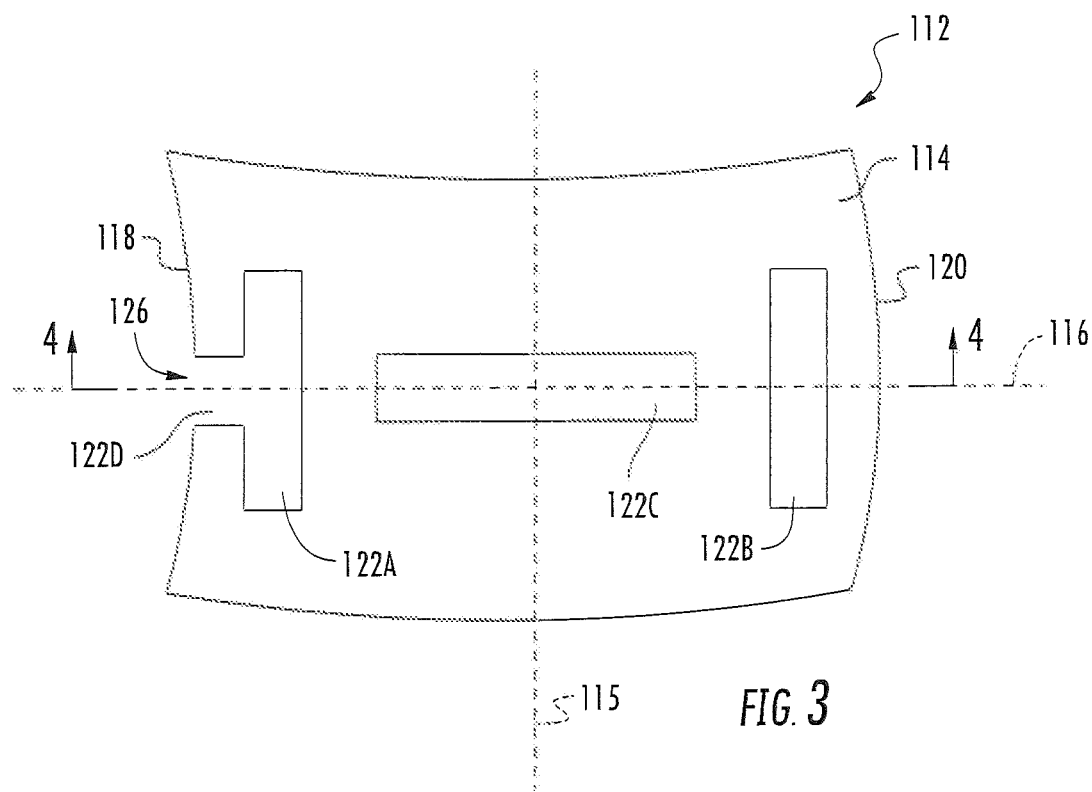
FIG. 3 is a top perspective view of a blade root attachment lug in one embodiment.

FIG. 3 illustrates a top perspective view of an embodiment of a blade root attachment lug 112. In one embodiment, each blade root attachment lug 112 includes an attachment lug surface 114, a blade root attachment lug transverse axis 115, and a blade root attachment lug longitudinal axis 116, wherein the blade root attachment lug transverse axis 115 is substantially perpendicular to the blade root attachment lug longitudinal axis 116. Each attachment lug surface 114 includes a proximal end 118 and a distal end 120. The fan rotor 110 further includes at least one cavity 122 disposed in each attachment lug surface 114. It will be appreciated that each of the at least one cavities 122 may be formed in any shape (e.g. conical or triangular to name just two non-limiting examples) to allow platform rotation along the blade root attachment lug transverse axis 115 without impediment.

In one embodiment of the blade root attachment lug 112, a first cavity 122A is disposed in the attachment lug surface 114 between the blade root attachment lug transverse axis 115 and the proximal end 118 of the attachment lug surface 114. In one embodiment, a second cavity 122B is disposed in the attachment lug surface 114 between the blade root attachment lug transverse axis 115 and the distal end 120. In one embodiment, a third cavity 122C is disposed in the attachment lug surface 114 between the first cavity 122A and the second cavity 122B. In one embodiment, a fourth cavity 122D is disposed in the attachment lug surface 114, wherein the fourth cavity 122D penetrates the proximal end 118 of the attachment lug surface 114, and is adjacent to the first cavity 122A. In one embodiment, a blade root attachment lug aperture 126 is disposed within the blade root attachment lug 112. In one embodiment, the blade root attachment lug aperture 126 includes an aperture longitudinal axis that is substantially parallel to the blade root attachment lug longitudinal axis 116. In one embodiment, the blade root attachment lug aperture 126 intersects each of the at least one cavities 122.

Figure 4:
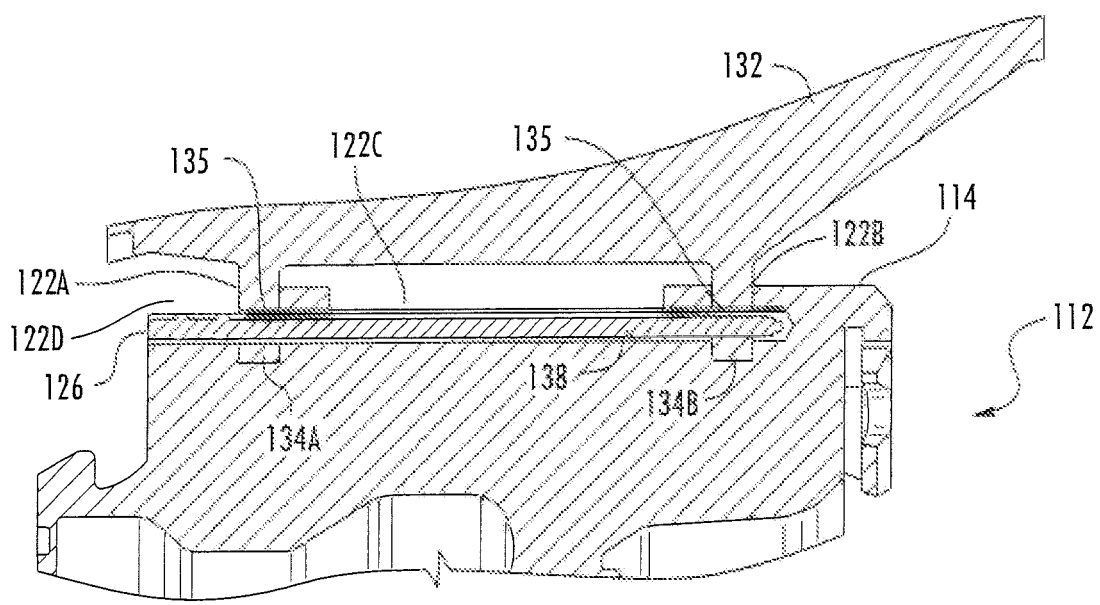
FIG. 4 is a schematic cross-sectional diagram of a platform attachment tab in an embodiment.

FIG. 4 illustrates a cross-sectional view of a portion of the fan rotor 110 illustrated in FIG. 3. During installation of the fan section 102, the fan blade platform 132 is operably coupled to each of the blade root attachment lugs 112. Each fan blade platform 132 includes at least one connector 134 extending from a bottom of each fan blade platform 132. Each of the at least one connectors 134 include a fan blade platform aperture 135 formed therethrough. In one embodiment, to secure the fan blade platform 132 to a respective blade root attachment lug 112, the first connector 134A is inserted into the first cavity 122A, and the second connector 134B is inserted into the second cavity 122B. A pin 138 is inserted through blade root attachment lug aperture 126 to pass through each of the fan blade platform apertures 135 in the first connector 134A and the second connector 134B. The fourth cavity 122D may be used to inspect the pin 138 after installation.

Figure 5:
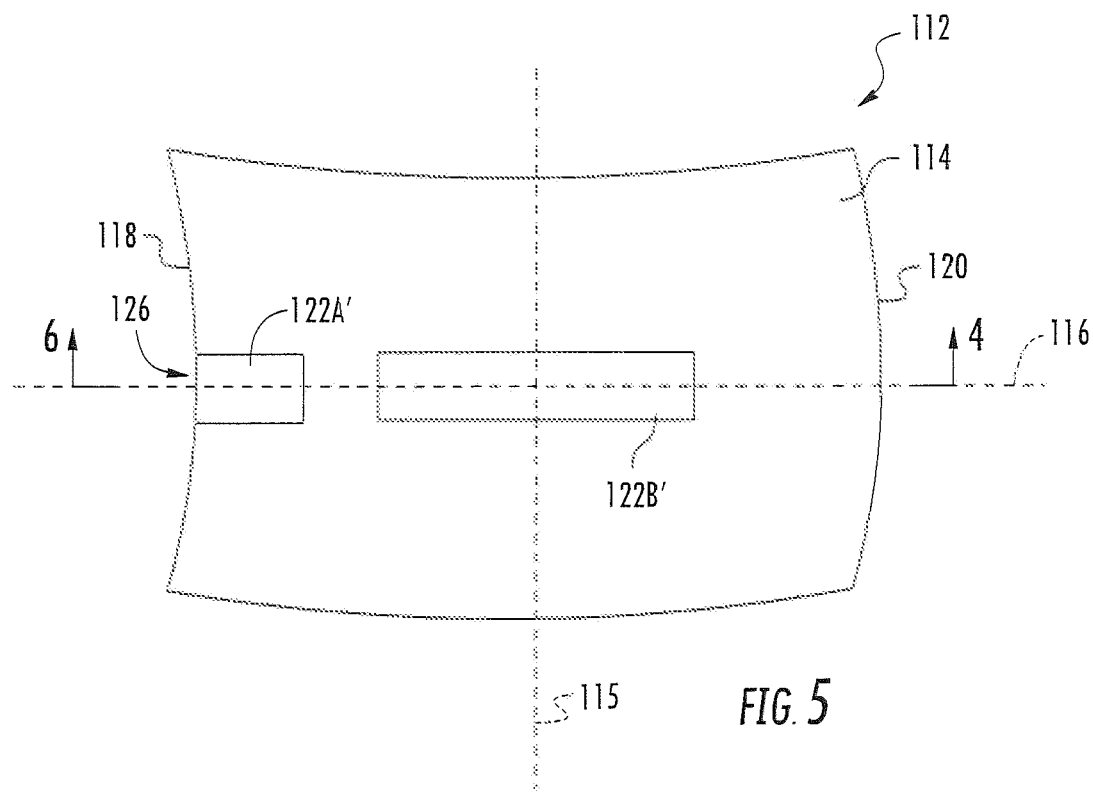
FIG. 5 is a top perspective view of a blade root attachment lug in another embodiment.

FIG. 5 illustrates a top perspective view of another embodiment of a blade root attachment lug 112. In another embodiment, a first cavity 122A' is disposed on the attachment lug surface 114 between the proximal end 118 and the blade root attachment lug transverse axis 115. In one embodiment, the first cavity 122A' penetrates the proximal end 118 of the attachment lug surface 114. In one embodiment, a second cavity 122B' is disposed on the attachment lug surface 114 at approximately a midpoint between the proximal end 118 and the distal end 120 of the attachment lug surface 114. In one embodiment, the blade root attachment lug aperture 126 includes an aperture longitudinal axis that is substantially parallel to the blade root attachment lug longitudinal axis 116. In one embodiment, the blade root attachment lug aperture 126 intersects each of the at least one cavities 122.

Figure 6:
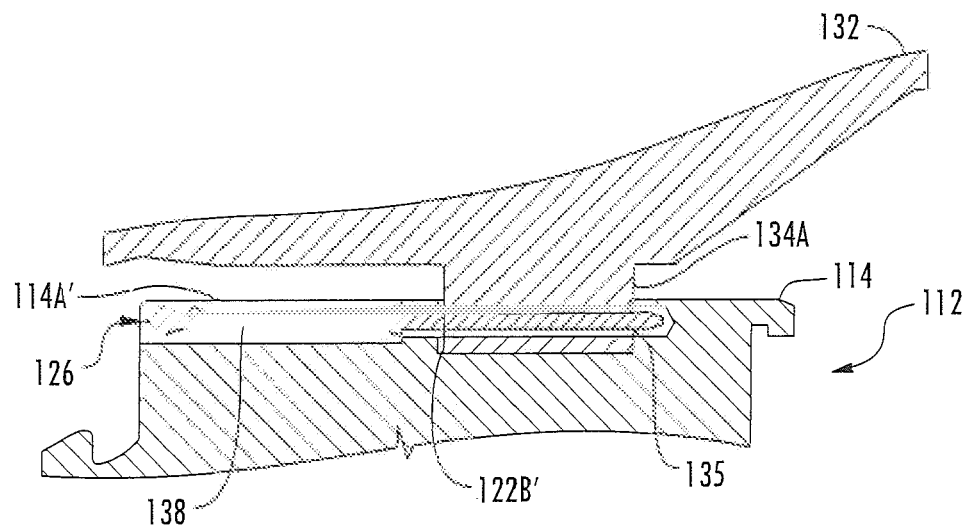
FIG. 6 is a schematic cross-sectional diagram of a platform attachment tab in another embodiment.

FIG. 6 illustrates a cross-sectional view of a portion of the fan rotor 110 illustrated in FIG. 5. During installation of the fan section 102, the fan blade platform 132 is operably coupled to each of the blade root attachment lugs 112. Each fan blade platform 132 includes at least one connector 134 extending from a bottom of each fan blade platform 132. Each of the at least one connectors 134 include a fan blade platform aperture 135 formed therethrough. In one embodiment, to secure the fan blade platform 132 to a respective blade root attachment lug 112, the at least one connector 134 is inserted into the second cavity 122B'. A pin 138 is inserted through blade root attachment lug aperture 126 to pass through each of the fan blade platform apertures 135 in the at least one connector 134. The first cavity 122A' may be used to inspect the pin 138 after installation.

It will be appreciated from the present disclosure that the embodiments disclosed herein provide for a fan rotor 110 including at least one cavity 122 disposed on the attachment lug surface 114 of the blade root attachment lug 112 may reduce manufacturing costs of the fan rotor 110.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A fan rotor for an aircraft engine, the fan rotor comprising:
   a rotor disk and a plurality of outwardly extending rotor blades, each rotor blade including an airfoil portion, a dove-tailed portion and a platform;
   at least one separate fan blade platform attached to the rotor disk;
   at least one blade root attachment lug, including an attachment lug surface, a blade root attachment lug transverse axis, and a blade root attachment lug longitudinal axis;
   the blade root attachment lug transverse axis being perpendicular to the blade root attachment lug longitudinal axis;
   the attachment lug surface extending from a proximal end located at one end of the rotor disk to a distal end located at an opposite end of the rotor disk;
   a first cavity and a second cavity disposed in the attachment lug surface, wherein the second cavity is completely surrounded by the attachment lug surface;
   wherein the at least one separate fan blade platform is secured to the at least one blade root attachment lug by first connector that is inserted into the first cavity and a second connector that is inserted into the second cavity; and
   a pin securing the at least one separate fan blade platform to the at least one blade root attachment lug, wherein the pin is inserted into the at least one separate fan blade platform through a blade root attachment lug aperture that intersects the first cavity and the second cavity, wherein the pin passes through a fan blade platform aperture of the first connector and a fan blade platform aperture of the second connector, and the blade root attachment lug aperture when the at least one separate fan blade platform is secured to the at least one blade root attachment lug by the pin.

2. The fan rotor of claim 1, wherein the first cavity is disposed between the blade root attachment lug transverse axis and the proximal end of the attachment lug surface.

3. The fan rotor of claim 2, wherein the first cavity penetrates the proximal end of the attachment lug surface.

4. The fan rotor of claim 2, wherein the second cavity is disposed between the blade root attachment lug transverse axis and the distal end of the attachment lug surface.

5. A fan rotor for an aircraft engine, the fan rotor comprising:
   a rotor disk and a plurality of outwardly extending rotor blades, each rotor blade including an airfoil portion, a dove-tailed portion and a platform;
   at least one separate fan blade platform attached to the rotor disk;
   at least one blade root attachment lug, including an attachment lug surface, a blade root attachment lug transverse axis, and a blade root attachment lug longitudinal axis;
   the blade root attachment lug transverse axis being perpendicular to the blade root attachment lug longitudinal axis;
   the attachment lug surface extends from a proximal end located at one end of the rotor disk to a distal end located at an opposite end of the rotor disk to;
   a first cavity and a second cavity disposed in the attachment lug surface, wherein the second cavity is completely surrounded by the attachment lug surface, and wherein the second cavity is disposed at a midpoint between the proximal end and the distal end of the attachment lug surface;
   wherein the at least one separate fan blade platform is secured to the at least one blade root attachment lug by first connector that is inserted into the second cavity; and
   a pin securing the at least one separate fan blade platform to the at least one blade root attachment lug, wherein the pin is inserted into the at least one separate fan blade platform through a blade root attachment lug aperture that intersects the first cavity and the second cavity, wherein the pin passes through a fan blade platform aperture of the second connector, and the blade root attachment lug aperture when the at least one separate fan blade platform is secured to the at least one blade root attachment lug by the pin.

6. The fan rotor of claim 1, wherein the blade root attachment lug aperture includes an aperture longitudinal axis that is parallel to the blade root attachment lug longitudinal axis.

7. The fan rotor of claim 4, wherein a third cavity is disposed in the attachment lug surface.

8. The fan rotor of claim 7, wherein the third cavity is disposed between the first cavity and the second cavity.

9. The fan rotor of claim 8, wherein the third cavity includes a third cavity longitudinal axis that is parallel to the blade root attachment lug longitudinal axis.

10. The fan rotor of claim 7, wherein a fourth cavity is disposed in the attachment lug surface.

11. The fan rotor of claim 10, wherein the fourth cavity penetrates the proximal end of the attachment lug surface and is adjacent to the first cavity.

12. The fan rotor of claim 1, wherein the at least one blade root attachment lug comprises a plurality of blade root attachment lugs.

13. A gas turbine engine comprising:
   a fan rotor and a plurality of outwardly extending rotor blades, each rotor blade including an airfoil portion, a dove-tailed portion and a platform;
   at least one separate fan blade platform operably coupled to a fan rotor;
   the fan rotor comprising:
   at least one blade root attachment lug, including an attachment lug surface, a blade root attachment lug transverse axis, and a blade root attachment lug longitudinal axis;
   the blade root attachment lug transverse axis being perpendicular to the blade root attachment lug longitudinal axis;
   the attachment lug surface extends from a proximal end located at one end of the rotor disk to a distal end located at an opposite end of the rotor disk;
   at least one cavity disposed in the attachment lug surface, wherein the at least one cavity is completely surrounded by the attachment lug surface;
   wherein the at least one separate fan blade platform is secured to the at least one blade root attachment lug by at least one connector that is inserted into the at least one cavity; and
   a pin securing the at least one separate fan blade platform to the at least one blade root attachment lug, wherein the pin is inserted into the at least one separate fan blade platform through a blade root attachment lug aperture that intersects the at least one cavity and wherein the pin passes through a fan blade platform aperture of the at least one connector, the at least one cavity and the blade root attachment lug aperture when the at least one separate fan blade platform is secured to the at least one blade root attachment lug by the pin.

14. The gas turbine engine of claim 13, wherein the at least one blade root attachment lug comprises a plurality of blade root attachment lugs.

\* \* \* \* \*